C. W. Inglis.
Preparing Peat.
№ 75763.    Patented Mar. 24, 1868.

Witnesses
W. C. Dey
C. C. Livings

Inventor
C. W. Inglis

United States Patent Office.

CHARLES W. INGLIS, OF PATERSON, NEW JERSEY

*Letters Patent No. 75,763, dated March 24, 1868.*

IMPROVEMENT IN MACHINES FOR PREPARING PEAT.

*The Schedule referred to in these Letters Patent and making part of the same.*

TO ALL WHOM IT MAY CONCERN:

Be it known that I, CHARLES W. INGLIS, of Paterson, in the county of Passaic, and State of New Jersey, have invented certain new and useful Improvements in Machines for Preparing Peat; and I do hereby declare that the following is a full and exact description thereof.

My improved machine is adapted for the treatment of peat in a green, or in a partially-dried state. It mixes and grinds the material in a plastic state, and crowds it through a rectangular former, by a novel construction and arrangement of mechanism. The material is subsequently cut into convenient pieces, by hand or otherwise, and may be dried and used in that form, or it may be subsequently treated in any approved manner.

It will, of course, be understood that coal-dust, or any other desired material, may be mixed with the peat in the course of the treatment, if preferred.

I will proceed to describe what I consider the best means of carrying out my invention. The accompanying drawings form a part of this specification.

Figure 1:
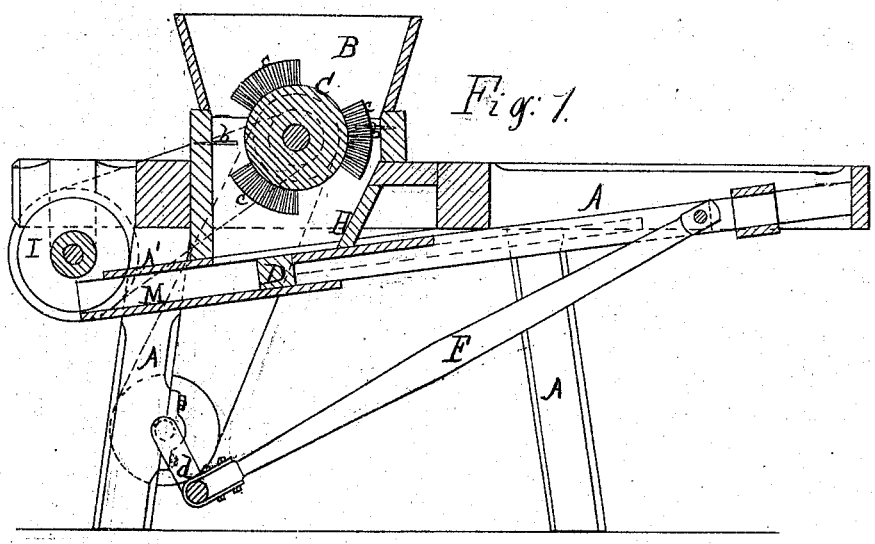
Figure 2:
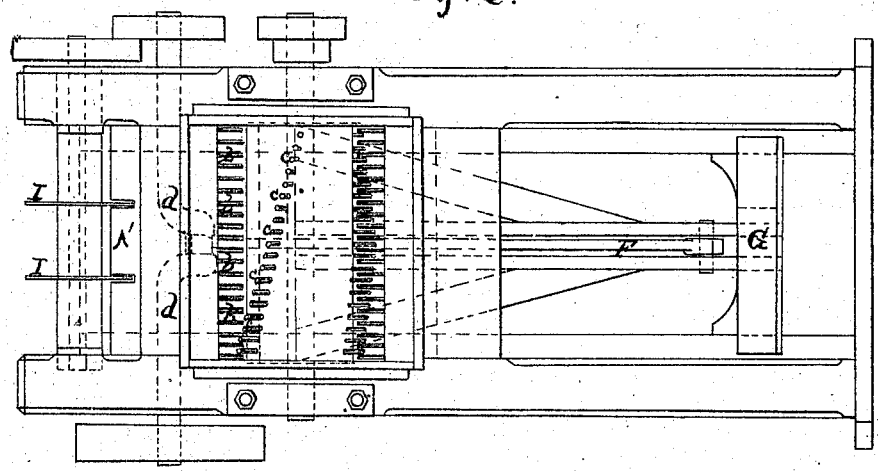

Figure 1 is a longitudinal vertical section, and
Figure 2 a plan view of the entire machine.
Similar letters of reference indicate like parts in all the figures.

A is the framework of the machine; B is the hopper, having small pins or teeth, as indicated by $b$; C is a revolving drum, having teeth on its cylindrical surface, as indicated by $c$. The peat is thrown into the hopper B, and is mixed and ground by being treated between the teeth $b$ and $c$. It is thrown down in a continuous or nearly continuous stream or sheet.

$A^1$ is a fixed casing, which forms the upper boundary of the rectangular space M, through which the plastic peat is pushed at intervals by the reciprocating crowder D. This crowder is flat, and is moved backward and forward on the table or flat extended surface beneath, being actuated by the crank E, driven by steam or other convenient power, the connection of which to the crowder is very plainly indicated by the drawings. The connecting-rod F, leading to a cross-head, G, imparts motion to the crowder D by means of the stiff rod $d$.

H is a scraper, which effectually removes all the plastic material which is thrown down upon the crowder during its forward movement. At each movement of the crowder it urges forward the plastic material in front of it, forcing it under the casing $A^1$, compelling the matter previously pressed in the space M forward in the enlarged space. At each backward movement of the crowder D, the material received on its upper surface in the interval, is removed by the scraper H, and this, with the additional material poured down during the period, is forced forward at the next return of the crowder.

I is a rotating cutter, which divides the peat after it has been moulded, by passing through the space M. The cutter can be varied indefinitely, and each variation will vary the form or proportions of the masses thereby cut. The cutting may, if preferred, be effected by a mechanism analogous to that employed in cracker-machines, or there may be a cross-reciprocating or even a cross-rotating motion of the cutters. There may be, if preferred, an endless apron, to receive the peat after it has been moulded in the space M. This apron may be carried forward by an intermediate motion received through gearing or the like, corresponding nearly or exactly with the forward motion of the peat through the space M; or the driving-mechanism may, with proper arrangements of the parts, be dispensed with, and the endless apron may be put forward with its load, by the force, simply, of the current of peat issuing through the space M.

I have tested my machine with much success, and believe that it contains the important objects, in such mechanism, of cheapness, simplicity, and very great efficiency.

Having now fully described my invention, what I claim as new in machines adapted for treating peat, and desire to secure by Letters Patent, is as follows:

1. I claim the reciprocating crowder D, scraper H, and passage M, arranged relatively to the mill A $a$, B $b$, or its equivalent, substantially in the manner and so as to operate as herein set forth.

2. I claim the cutter I, passage M, reciprocating crowder D, and mill A B, combined and arranged as herein represented and described.

C. W. INGLIS.

Witnesses:
W. C. DEY,
C. C. LIVINGS.